R. W. & D. DAVIS.
Wheels for Vehicles.

No. 148,422.  Patented March 10, 1874.

Witnesses:
Fred Hynne
D. Miell

Robert W. Davis
Daniel Davis
by their attorneys
Brown & Allen

UNITED STATES PATENT OFFICE.

ROBERT W. DAVIS, OF BATH, AND DANIEL DAVIS, OF BROOKLYN, N. Y.

IMPROVEMENT IN WHEELS FOR VEHICLES.

Specification forming part of Letters Patent No. 148,422, dated March 10, 1874; application filed March 24, 1873.

*To all whom it may concern:*

Be it known that we, ROBERT W. DAVIS, of Bath, in the county of Steuben and State of New York, and DANIEL DAVIS, of Brooklyn, in the county of Kings and State of New York, have jointly invented an Improved Wheel for Vehicles, of which the following is a specification:

This invention relates to a new manner of fastening and drawing the spokes of wagon and carriage wheels when said spokes are made in pairs, the two spokes of each pair being joined or intimately connected in the hub.

The invention consists principally in forming within the hub lugs or ears, around which the bends of the joined pairs of spokes are placed, and in providing said lugs or ears with set-screws bearing against the bends aforesaid, so that by such screws the spokes can be drawn tight or slackened at will. Finally, our invention consists in a new manner of fastening the outer ends of the spokes in the fellies of the wheel by means of rivets or screws passing through the outer ends of the spokes into the contiguous ends of the fellies, which fellies are, by preference, hollow, except at the ends, where they are solid, to receive the rivets or screws.

Figure 1:
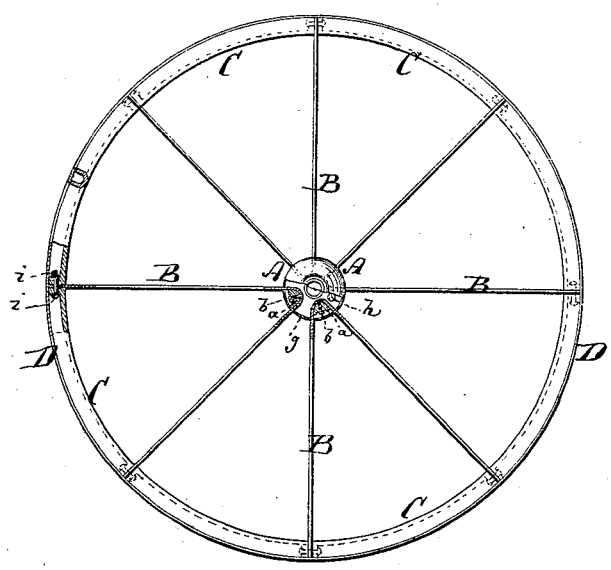
Figure 2:
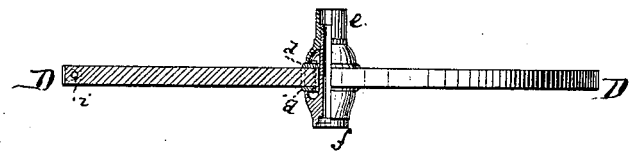
Figure 3:
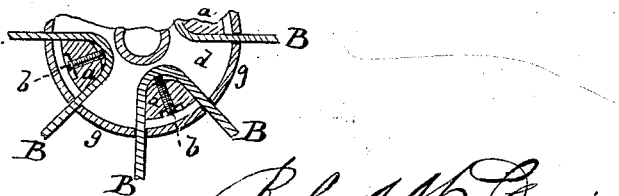

In the accompanying drawing, Figure 1 represents a face view, partly in section, of a wheel made on our improved plan; and Fig. 2, an edge view, partly in section, of the same. Fig. 3 is a detail sectional face view of the hub, showing the parts on an enlarged scale.

Similar letters of reference indicate corresponding parts in all the figures.

The letter A represents the hub, B B the spokes, C C the fellies, and D the tire, of the wheel. The spokes B are made of strap or flat metal, in pairs, the outer ends of each pair being secured in the fellies, while at the inner ends the metal of which each pair is composed is laid around an ear or lug, $a$, that is formed within the hub. A set-screw, $b$, passing through such ear or lug, bears against the bent portion of the metal that constitutes the two spokes, and serves, when screwed inwardly, to bind the spokes and stretch the same, and, when unscrewed more or less, to slacken the spokes. It is evident that a wheel of this construction must have an even number of spokes, and that in the hub half as many lugs $a$ and screws $b$ are provided as there are spokes. The bent inner parts of the spokes are confined between two plates, $d\ d$, of the hub, these plates being held together by means of the two portions $e\ f$ of the box or hub, which two portions are connected by a tubular screw, which passes from the box $f$ into the box $e$, to hold all the parts properly together. The lugs or ears $a\ a$ are formed on or firmly fastened to the inner face of one of the plates $d$. The other plate $d$ has a rim, $g$, which is slotted, or, rather, slit, to admit the spokes B B, and which extends toward and against the other plate $d$, so as to close the space between these two plates $d\ d$, and between the spokes. Suitable screws $h$ may also be used for drawing the two plates $d\ d$ firmly together. The outer ends of the spokes extend clear to the rim D, and between the ends of the sections of fellies. They are fastened, by means of rivets $i$, or screws, or equivalent pins, to the contiguous ends of the fellies; and we prefer, in this connection, to use hollow fellies of metal, which have their ends made solid to receive such rivets or screws $i$, in manner indicated in Fig. 1. However, we do not confine ourselves to the use of hollow fellies in connection with our improved wheel, as solid fellies, of wood or metal, may be used when the same are provided with recesses near their ends to permit the application of these rivets or screws $i$.

We claim—

1. The screws $b$, arranged in the lugs $a$ of the hub, to bear against the inner portions of the double spokes, substantially as and for the purpose herein specified.

2. The combination of the hub, having the lugs $a$ and screws $b$, with the spokes B, pins $i$, and fellies C, the pins $i$ being arranged to connect the spokes and fellies, substantially in the manner herein shown and described.

ROBERT W. DAVIS.
DANIEL DAVIS.

Witnesses to the signature of ROBERT W. DAVIS:
    CLINTON W. RICHARDSON,
    ARTHUR W. DAVIS.

Witnesses to the signature of DANIEL DAVIS:
    FRED. HAYNES,
    MICHAEL RYAN.